(12) United States Patent
Fink

(10) Patent No.: US 9,387,733 B2
(45) Date of Patent: *Jul. 12, 2016

(54) METHOD AND DEVICE FOR LOCATING THE INSTALLATION POSITION OF VEHICLE WHEELS IN A MOTOR VEHICLE

(75) Inventor: Alexander Fink, Oakland Township, MI (US)

(73) Assignee: Continental Automotive GmbH, Hannover (DE)

( * ) Notice: Subject to any disclaimer, the term of this patent is extended or adjusted under 35 U.S.C. 154(b) by 43 days.

This patent is subject to a terminal disclaimer.

(21) Appl. No.: 13/518,271

(22) PCT Filed: Dec. 9, 2010

(86) PCT No.: PCT/EP2010/069283
§ 371 (c)(1),
(2), (4) Date: Jun. 21, 2012

(87) PCT Pub. No.: WO2011/085877
PCT Pub. Date: Jul. 21, 2011

(65) Prior Publication Data
US 2012/0259507 A1    Oct. 11, 2012

(30) Foreign Application Priority Data
Dec. 21, 2009 (DE) .......................... 10 2009 059 788

(51) Int. Cl.
*G01M 17/013* (2006.01)
*B60C 23/04* (2006.01)
(52) U.S. Cl.
CPC ......... *B60C 23/0416* (2013.01); *B60C 23/0489* (2013.01)

(58) Field of Classification Search
CPC ........... B60C 23/0416; B60C 23/0489; B60G 2204/11; G01M 17/013
USPC .............................. 701/1, 41, 74, 96
See application file for complete search history.

(56) References Cited

U.S. PATENT DOCUMENTS 4,567,757 A * 2/1986 Melocik et al. ................. 73/129
5,041,983 A * 8/1991 Nakahara et al. ............. 701/533
(Continued)

FOREIGN PATENT DOCUMENTS

DE        19618658 A1    11/1997
DE       197 34 323 A1     2/1999
(Continued)

*Primary Examiner* — Jerrah Edwards
*Assistant Examiner* — Aaron Smith
(74) *Attorney, Agent, or Firm* — Lawrence A. Greenberg; Werner H. Stemer; Ralph E. Locher

(57) ABSTRACT

A method locates an installation position of vehicles wheels in a motor vehicle having at least one vehicle wheel containing a wheel electronics unit. The method includes: determining from the wheel electronics unit a first rotational angle position of the vehicle wheel associated with the wheel electronics unit; transmitting a transmission signal with a first piece of rotational angle information dependent on the determined first rotational angle position; determining from the vehicle second rotational angle positions of the vehicle wheels, and depending thereon, providing second rotational angle information. The first rotational angle information is compared with the second rotational angle information. The installation position of the vehicle wheel associated with the wheel electronics unit is determined depending on the comparison. A device is provided for performing the method.

20 Claims, 11 Drawing Sheets

(56) References Cited

U.S. PATENT DOCUMENTS

| | | | |
|---|---|---|---|
| 5,764,137 A * | 6/1998 | Zarkhin | 340/444 |
| 5,808,190 A | 9/1998 | Ernst | |
| 6,092,028 A * | 7/2000 | Naito et al. | 702/47 |
| 6,112,587 A * | 9/2000 | Oldenettel | 73/146.5 |
| 6,122,586 A * | 9/2000 | Shimizu | 701/74 |
| 6,327,785 B1 * | 12/2001 | Dale et al. | 33/288 |
| 6,435,020 B1 | 8/2002 | Oldenettel et al. | |
| 6,705,156 B2 * | 3/2004 | Shteinhauz et al. | 73/146 |
| 6,922,140 B2 | 7/2005 | Hernando et al. | |
| 7,278,694 B2 * | 10/2007 | Choi et al. | 303/156 |
| 7,289,022 B2 * | 10/2007 | Ogawa et al. | 340/447 |
| 7,336,161 B2 | 2/2008 | Walraet | |
| 7,385,494 B2 | 6/2008 | Mori et al. | |
| 7,411,488 B2 | 8/2008 | Watabe et al. | |
| 7,577,500 B2 * | 8/2009 | Nihei et al. | 701/1 |
| 8,013,725 B2 * | 9/2011 | Murata et al. | 340/447 |
| 8,332,103 B2 | 12/2012 | Greer et al. | |
| 2003/0078712 A1 * | 4/2003 | Shimakage et al. | 701/41 |
| 2004/0021562 A1 * | 2/2004 | Prenninger | 340/445 |
| 2006/0087420 A1 | 4/2006 | Walraet | |
| 2008/0246467 A1 * | 10/2008 | Vial et al. | 324/207.25 |
| 2009/0027183 A1 * | 1/2009 | Kvisteroy et al. | 340/447 |
| 2010/0299044 A1 * | 11/2010 | Miyake et al. | 701/96 |

FOREIGN PATENT DOCUMENTS

| | | | |
|---|---|---|---|
| DE | 198 49 390 A1 | 5/2000 | |
| DE | 199 21 413 C1 | 11/2000 | |
| EP | 0 997 326 A2 | 5/2000 | |
| EP | 0997326 A2 | 5/2000 | |
| JP | 2003159920 A | 6/2003 | |
| JP | 2003-237328 * | 8/2003 | |
| JP | 2003237328 A * | 8/2003 | B60C 23/02 |
| JP | 2004171519 A | 6/2004 | |
| JP | 2004331011 A | 11/2004 | |
| JP | 2006298182 A | 11/2006 | |
| JP | 2006312342 A | 11/2006 | |
| WO | 2011038033 A1 | 3/2011 | |

* cited by examiner

| Time | Vehicle wheel F1 | | F2 | |
|---|---|---|---|---|
| | Counter reading | Wheel angle position [degrees] | Counter reading | Wheel angle position [degrees] |
| T1 | 354 | 248 | 187 | 341 |
| T2 | 1315 | 251 | 1246 | 353 |
| T3 | 2178 | 248 | 2182 | 263 |
| T4 | 3138 | 248 | 3232 | 240 |
| T5 | 3906 | 248 | 4104 | 270 |
| T6 | 4769 | 244 | 5082 | 338 |
| T7 | 5440 | 240 | 5814 | 203 |
| T8 | 6303 | 236 | 6782 | 233 |
| T9 | 7073 | 244 | 7635 | 191 |
| T10 | 7554 | 248 | 8150 | 323 |
| T11 | 8224 | 240 | 8910 | 293 |
| T12 | 9088 | 240 | 9881 | 334 |
| T13 | 9760 | 240 | 10606 | 173 |
| T14 | 10334 | 233 | 11237 | 19 |
| T15 | 11006 | 233 | 11946 | 158 |
| T16 | 11776 | 240 | 12802 | 128 |
| T17 | 12736 | 240 | 13844 | 75 |
| T18 | 13504 | 240 | 14689 | 4 |
| T19 | 14176 | 240 | 15412 | 195 |
| T20 | 14654 | 233 | 15949 | 49 |

Table 2

FIG. 8

| Time difference | Vehicle wheel F1 | | | Vehicle wheel F2 | | |
|---|---|---|---|---|---|---|
| | Counter reading | Number of revolutions | Difference from a full revolution [degrees] | Counter reading | Number of revolutions | Difference from a full revolution [degrees] |
| T1 - T2 | 961 | 10.01 | 3.8 | 1059 | 11.03 | 11.3 |
| T1 - T3 | 1824 | 19.00 | 0.0 | 1995 | 20.78 | -78.8 |
| T1 - T4 | 2784 | 29.00 | 0.0 | 3045 | 31.72 | -101.3 |
| T1 - T5 | 3552 | 37.00 | 0.0 | 3917 | 40.80 | -71.3 |
| T1 - T6 | 4415 | 45.99 | -3.8 | 4895 | 50.99 | -3.8 |
| T1 - T7 | 5086 | 52.98 | -7.5 | 5627 | 58.61 | -138.8 |
| T1 - T8 | 5949 | 61.97 | -11.3 | 6595 | 68.70 | -108.8 |
| ~ | ~ | ~ | ~ | ~ | ~ | ~ |
| ~ | ~ | ~ | ~ | ~ | ~ | ~ |
| T17 - T18 | 768 | 8.00 | 0.0 | 845 | 8.80 | -71.3 |
| T17 - T19 | 1440 | 15.00 | 0.0 | 1568 | 16.33 | 120.0 |
| T17 - T20 | 1918 | 19.98 | -7.5 | 2105 | 21.93 | -26.3 |
| T18 - T19 | 672 | 7.00 | 0.0 | 723 | 7.53 | -168.8 |
| T18 - T20 | 1150 | 11.98 | -7.5 | 1260 | 13.13 | 45.0 |
| T19 - T20 | 478 | 4.98 | -7.5 | 537 | 5.59 | -146.3 |

METHOD AND DEVICE FOR LOCATING THE INSTALLATION POSITION OF VEHICLE WHEELS IN A MOTOR VEHICLE

BACKGROUND OF THE INVENTION

Field of the Invention

The present invention relates to a method and an apparatus for localizing the installation positions of vehicle wheels in a motor vehicle.

A wide variety of causes, for example the ambient pressure of the wheel, temperature, age of the wheel, etc., mean that the tire pressure of a vehicle wheel is subject to certain changes. In this connection, it has been found that an incorrectly adjusted tire pressure is a significant factor in the case of road traffic accidents. Since vehicle safety and reliability are central factors in the automotive sector, it is necessary for the tire pressure to be checked regularly for safety reasons alone. However, studies have shown that only few drivers of a vehicle check tire pressure regularly. For these reasons inter alia, modern motor vehicles have tire information apparatuses, such as tire pressure control systems. These tire information apparatuses have wheel electronics installed in the vehicle wheel which measure wheel-specific measured values for different measured variables (e.g. tire pressure, tire temperature, wheel load, etc.) and send information derived therefrom to a reception device in the vehicle.

Tire information systems typically use electronic wheel units which are associated with each vehicle wheel and which send the data ascertained in vehicle wheels to a central evaluation device in the vehicle by means of radio-frequency transmission signals. Electronic wheel units, which are subsequently called wheel electronics for short, may be understood to be any device which ascertains wheel-specific information and states which can be used to detect error states possibly occurring on the vehicle wheel. In the present connection, the term error state can be interpreted broadly and covers all states, properties and information from a respective wheel which can be considered worthy of detection.

However, one problem in this connection is that of making an automatic and explicit association between a received transmission signal and the initially unknown wheel position from the transmitter, that is to say the wheel electronics. Although wheel electronics can also transmit an identifier which is explicit for said wheel electronics in the transmission signal that is sent, as described in EP 626 911 B1, this does not yet reveal at what location in the vehicle said vehicle wheel is actually fitted, that is to say installed. In addition to the actual detection of an error state, modern tire information systems therefore also involve ascertainment of what is known as the installation position of the individual vehicle wheels with reference to the vehicle. The relevant literature also refers to this as localization.

BRIEF SUMMARY OF THE INVENTION

Against this background, the present invention is based on the object of specifying localization of the vehicle wheels which is as simple and reliable as possible.

Accordingly, the following are provided:
A method for localizing the installation positions of vehicle wheels in a motor vehicle, in which at least one vehicle wheel has wheel electronics, having the following steps:
the wheel electronics determine a first rotation angle position for the vehicle wheel associated with said wheel electronics; a transmission signal is sent with a first rotation angle information item which is dependent on the ascertained first rotation angle position; the vehicle determines second rotation angle positions for the vehicle wheels, and said second rotation angle positions are taken as a basis for providing second rotation angle information items; the first rotation angle information item is aligned with second rotation angle information items; the installation position of the vehicle wheel associated with the wheel electronics is determined on the basis of said alignment.

An apparatus for localizing the installation positions of vehicle wheels in a motor vehicle, particularly using a method according to the invention having at least one wheel electronics unit which is arranged in a vehicle wheel and which is designed to determine a first rotation angle position for its associated vehicle wheel and to send a first rotation angle information item, which is dependent on the ascertained first rotation angle position, to a reception device in the vehicle; having at least one rotation speed sensor in the vehicle, said rotation speed sensor being designed to determine respective second rotation angle positions for their respective associated vehicle wheels and to take said second rotation angle positions as a basis for providing second rotation angle information items; having an evaluation device which aligns the first rotation angle information item with the at least two second rotation angle information items and takes said alignment as a basis for determining the installation position of the vehicle wheel associated with the wheel electronics.

A vehicle, particularly an automobile, having a plurality of wheels and having a tire information apparatus which is equipped with an apparatus according to the invention.

The invention is based on the insight that the vehicle wheels which are present on a vehicle generally rotate at more or less different speeds on account of various factors, influences and circumstances. This different rotation information is then used, according to the invention, to determine the installation position by aligning a rotation angle information item ascertained by wheel electronics with a rotation angle information item ascertained by the vehicle.

The inventive evaluation and alignment method described above advantageously also works for just sporadic radio transmissions. However, relatively rare transmissions will typically involve a corresponding increase in the convergence time required for the localization. In addition, the wheel electronics do not necessarily have to start a transmission for every revolution or to have made at least one respective transmission at particular time intervals, as is necessary with known methods, but rather it suffices if they perform the evaluation on the basis of the number of completed wheel revolutions, for example.

It is also not necessary for the position detection to be performed for every wheel revolution. This also reduces the power consumption of the wheel electronics, which is a particular advantage on account of the local power supply for the wheel electronics and hence the limited available power.

In addition, the method according to the invention also has few problems when the vehicle is traveling on bumpy or wet roads, that is to say in the case of roads with a low coefficient of friction or in the case of excessive slippage for the vehicle wheels. Quite to the contrary: greater or lesser wheel slip is even advantageous for the method according to the invention, since then the individual vehicle wheels differ from one another to a greater extent in terms of their rotational behavior. Accordingly, it is also irrelevant what distance a vehicle wheel or even the vehicle covers. Only the orientation or the rotation angle of the vehicle wheels is important. Advantageous refinements and developments of the invention can be found in the further subclaims in combination with the figures of the drawing.

In one preferred refinement of the invention, the wheel electronics send a plurality of transmission signals with a plurality of first rotation angle information items, corresponding to the number of transmission signals, at different instants and align said transmission signals with a corresponding number of corresponding second rotation angle information items.

Typically, at least two, preferably at least six and particularly still more preferably at least 20 sent transmission signals are used for determining the installation position.

In one preferred refinement, the wheel electronics send the various transmission signals at a respective firmly prescribed rotation angle position which is known by the wheel electronics, wherein the vehicle ascertains the second rotation angle positions for each received transmission signal at the instant of reception of said transmission signal, said second rotation angle positions being used to derive the second rotation angle information items.

In one preferred refinement, distribution of the second rotation angle information items is set up for each vehicle wheel, wherein the distribution includes the second rotation angle positions (e.g. in a representation from 0° to 360°) derived from the second rotation angle information items. The installation position is ascertained by evaluating the maximum values and/or the variances of the distribution.

In one preferred refinement, that distribution which has the greatest maximum values or the smallest variances is determined as the installation position of the vehicle wheel which is associated with said distribution.

In one preferred refinement, outliers in the distribution of the second rotation angle positions are detected and then eliminated before the distribution is evaluated.

In one preferred refinement, a cluster of second rotation angle positions close to 0° or 360° involves the distribution of the second rotation angle positions being shifted by a prescribed value on the abscissa, for example through 90° or 180°.

One preferred refinement has provision for the following: (a) determination of the respective second rotation angle positions for each vehicle wheel for at least two transmission signals received in succession by the vehicle from wheel electronics; (b) calculation of differential values for the respective rotation angle positions with reference to each vehicle wheel; (c) calculation of the quotients from the calculated differential values by a value which corresponds to a full revolution of a vehicle wheel; (d) determination of the installation position as that vehicle wheel which has the smallest quotient.

In one preferred refinement, the wheel electronics send at least N transmission signals. The evaluation and determination of the installation position of a vehicle wheel involve the use of at least N/2, preferably (N−1) and particularly preferably up to N*(N−1)/2 combinations of the second rotation angle positions, for each of which steps (b) and (c) are performed, wherein step (d) involves the determination of the installation position as that vehicle wheel which cumulatively has the smallest quotients and/or the smallest distribution of the quotients.

In one preferred refinement, delay times which are obtained by virtue of the creation of the telegram for the transmission signal by the wheel electronics, consciously inserted delays or waiting times, the sending of the transmission signal, the reception and evaluation of the transmission signal by the vehicle, the forwarding of the first rotation angle information items obtained from the received transmission signal, the ascertainment and forwarding of the second rotation angle information items and the alignment of the first and second rotation angle information items are also included in the evaluation and in the alignment.

In one preferred refinement, the second rotation speed sensors ascertain the second rotation speed positions by counting rising and/or falling clock edges, wherein a prescribed number of clock edges corresponds to a full revolution of a vehicle wheel.

In one preferred refinement of the apparatus according to the invention, the rotation speed sensor is in the form of an ESP rotation speed sensor or an ABS rotation speed sensor.

The above refinements and developments can, where useful, be combined with one another as desired. Further possible refinements, developments and implementations of the invention also cover combinations which have not been explicitly cited for features of the invention that have been described previously or that are described below for the exemplary embodiments. In particular, a person skilled in the art will also add individual aspects as improvements or additions to the respective basic form of the present invention.

The present invention is explained in more detail below using the exemplary embodiments which are specified in the figures of the drawing and in which:

BRIEF DESCRIPTION OF THE SEVERAL VIEWS OF THE DRAWING

FIG. 7 shows a table with the instants of 20 emissions from wheel electronics and the corresponding counter readings and angle positions for two different vehicle wheels;

FIG. 8 shows a table with different time differences, the relevant counter readings, the number of revolutions and the difference with reference to a full revolution for two different wheels;

DESCRIPTION OF THE INVENTION

Figure 1:
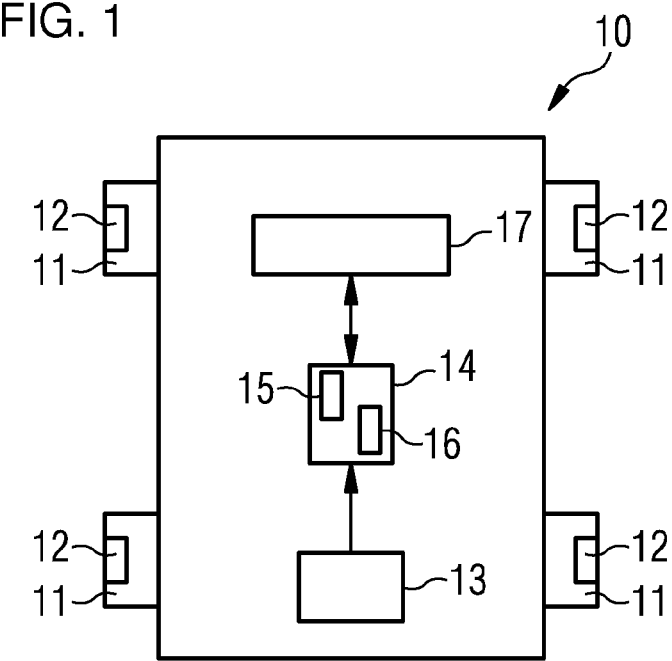
FIG. 1 shows a schematic illustration of a vehicle which is equipped with a tire information apparatus according to the invention.

In the figures of the drawing, elements which are the same and have the same function are—unless otherwise stated—provided with the same reference symbols in each case.

FIG. 1 shows a schematic illustration of a vehicle equipped with a tire pressure control apparatus. The vehicle, which in this case is denoted by reference symbol 10, has four vehicle wheels 11. Each vehicle wheel 11 has an associated wheel electronics unit 12. The vehicle is provided with a (or else two or more, for example) central transmission/reception unit 13 which is communicatively connected to the wheel electronics units 12. The wheel electronics units 12 and the transmission/reception unit 13 are collectively part of a tire information apparatus which, furthermore, has a central controller 14. Said tire information apparatus is also designed to perform localization of the different vehicle wheels 10. Said controller 14 also has a program controlled device 15, for example a microcontroller or microprocessor, and a memory device 16, for example a ROM or DRAM. Furthermore, the vehicle 10 has a driver information system 17.

Figure 2A:
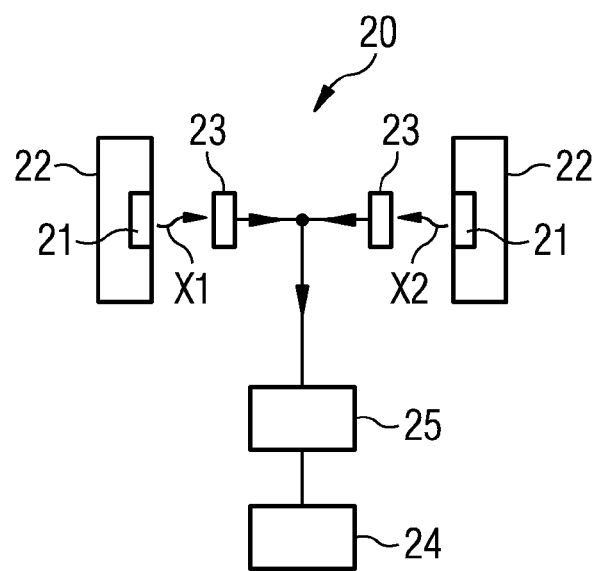
FIG. 2A shows a block diagram of an apparatus according to the invention for localizing the installation positions of vehicle wheels in a motor vehicle.

FIG. 2A shows a schematic block diagram of the apparatus according to the invention for localizing the installation position of vehicle wheels. In this regard, a motor vehicle having a tire information apparatus is first of all provided, said tire information apparatus having an apparatus for localizing the installation position of vehicle wheels. This apparatus is denoted by reference symbol 20 in FIG. 2A. The apparatus 20 has at least one wheel electronics unit 21 (two wheel electronics units 21 in the example shown) which are each arranged in a vehicle wheel 22. In addition, the apparatus 20 has a plurality of rotation speed sensors 23 in the vehicle which are each associated with different vehicle wheels 22. Finally, an evaluation device 24 is provided which is connected to the rotation speed sensors 23 via a stability control system 25. Said evaluation device 24 typically comprises a reception and alignment device (not shown here). The vehicle wheels 22 or the wheel electronics units 21 provided therein are communicatively connected to the vehicle by means of a wireless radio link in order to send transmission signals X1, X2 to a reception device—not shown here—in the vehicle, which reception device may be provided in the evaluation device. By way of example, the stability control system 25 may be an ABS and/or ESP system, as a result of which the rotation speed sensors 23 are not connected directly to the evaluation device 24. The connection between the stability control system 25 and the evaluation device 24 may be in the form of an internal communication bus, for example.

Figure 2B:
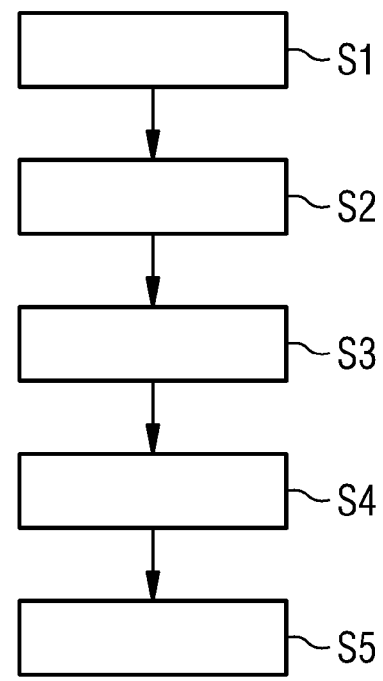
FIG. 2B shows a flowchart to explain the flow of the method according to the invention for localizing the installation positions.

FIG. 2B shows a flowchart to illustrate the method according to the invention for localizing the installation position of vehicle wheels in a motor vehicle. The method according to the invention is explained briefly below with reference to FIGS. 2A and 2B:

In method step S1, the wheel electronics determine a first rotation angle position for the vehicle wheel 22 associated with said wheel electronics unit 21. In the subsequent step S2, a transmission signal X1 is first of all provided which has said rotation angle position or a rotation angle information item which is dependent thereon. Furthermore, the transmission signal X1 may also contain further information, for example, wheel-specific information, such as the tire pressure or the tire temperature. This transmission signal provided in this manner is then sent by means of a transmission device in the wheel electronics. The transmission signal X1 sent in this manner is picked up by a reception device in the vehicle. In step S3, the vehicle then determines second rotation angle positions for the vehicle wheels 22, this involving the determination not only of that rotation angle position of the vehicle wheel 22 which is associated with the wheel electronics unit 21 sending the transmission signal X1, but also determination of the rotation angle positions of the remainder of the vehicle wheels 22. As a result, a number of rotation angle information items which typically corresponds to the number of vehicle wheels is obtained. In a subsequent step S4, the first and second rotation angle information items obtained in this manner are aligned with one another and are preferably compared with one another. In the final step S5, the installation position is determined and hence the vehicle wheel 22 associated with the wheel electronics 21 is localized on the basis of the alignment that has been made.

The text below explains different approaches for aligning the wheel angle information items ascertained by the wheel electronics and by the vehicle for the localization according to the invention:

The invention is based on the insight that the vehicle wheels which are present on a vehicle generally rotate at a more or less different speed.

The present invention is also based on the wheel electronics being capable of ascertaining a particular rotation angle position for the wheel electronics with reference to the vehicle. This information is used when the wheel electronics send a transmission signal (with a corresponding telegram) to the reception device in the vehicle. The telegram in the sense signal that is to be sent rejects not only wheel-specific information but also said rotation angle position or rotation angle information items derived therefrom. In this case, it is irrelevant and occasionally also not advantageous that the wheel electronics know precisely the exact measured rotation angle position. It is merely important that the wheel electronics and/or the evaluation device in the vehicle can ascertain the rotation angle position in which the wheel electronics send the transmission signal from the measured rotation angle information item, for example using known calculation times, transmission periods, vehicle speeds and the like.

The invention is also based on the vehicle being provided with a rotation speed sensor for each vehicle wheel, e.g. as part of an ESP or ABS system. Said rotation speed sensor can be used to determine rotation speed signal pulses and, derived therefrom, the precise wheel angle positions with reference to the vehicle.

The concept of the present invention thus involves wheel electronics repeatedly transmitting transmission signals. Said wheel electronics always transmit said transmission signals at precisely the same or at least a precisely known rotation angle position, which can be determined by the wheel electronics or can be deduced by the evaluation device. When said transmission signal is received by the vehicle, the respective wheel positions are determined by the vehicle, e.g. by means of the rotation speed sensor, at the instant of reception or at least at an instant that is derived therefrom and from the transmission instant.

Wheel Orientation, Wheel Angle Position

Figure 3:
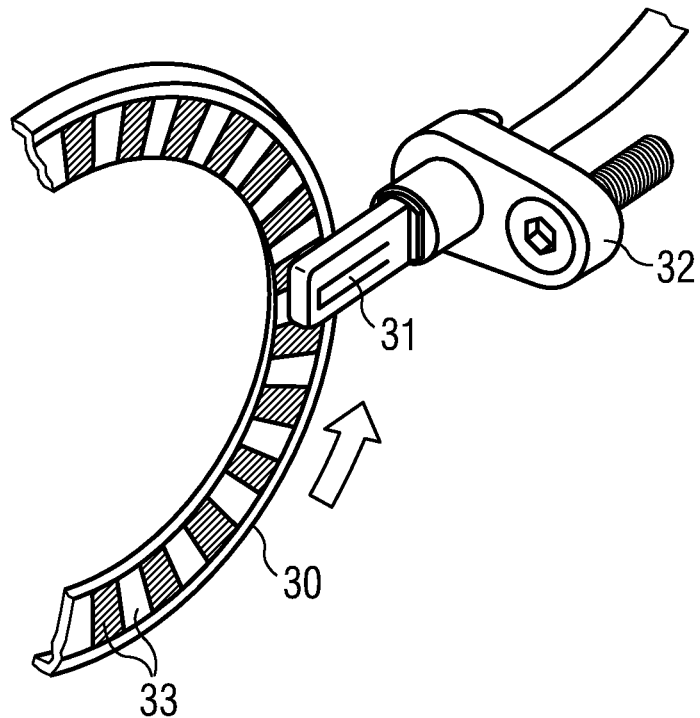
FIG. 3 shows a rotation speed sensor.
Figure 3A:
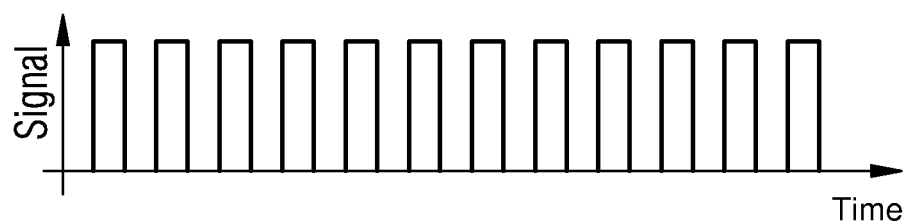
FIGS. 3A and 3B each show the output signals from a rotation speed sensor for a constant speed and a variable speed of the vehicle wheel.
Figure 3B:
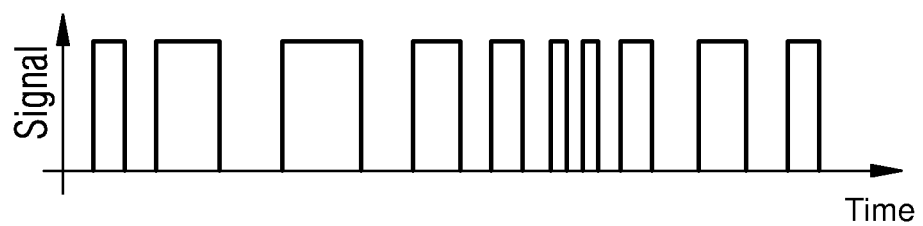

FIG. 3 schematically shows a rotation speed sensor. The reference symbol 30 in FIG. 3 is used to show a reference disk for rotation speed measurement and rotation angle determination for a vehicle wheel. Such a disk 30 is associated with each of the vehicle wheels and, by way of example, is permanently connected to the axis of rotation of the respective vehicle wheel 11. The disk 30 has a prescribed number of (separate) segments which can be used for exact rotation angle determination. By way of example, disks today have 48 segments 33 which are separated from one another by an intermediate region. In FIG. 3, a rotation speed sensor 31 is also provided which is in mechanical, electrical or optical contact with the disk 30 via a bracket 32. The bracket 32 may also contain an apparatus for evaluating the electrical signal delivered by the rotation speed sensor 31. By way of example, this evaluation device can count and evaluate the pulses counted by the rotation speed sensor 31 and can take them as a basis for determining a current rotation angle position. The different segments 33 on the disk 30 can be detected by means of the rotation speed sensor 31. For each change between a segment on the disk 30 and an adjacent segment, a barrier is produced, so that when there are 48 segments on a disk 30 it is possible to count a total of 96 barriers per complete wheel revolution. FIGS. 3A and 3B show the respective output signals from a rotation speed sensor for a constant speed of the vehicle wheel (FIG. 3A) and for a variable speed of the vehicle wheel (FIG. 3B). In this case, output signals are represented as successively occurring square wave pulses of constant amplitude. When the speed is increasing, the square wave pulses become narrower, and at a lower speed the square wave pulses become wider.

Rotation speed sensors usually do not have a defined zero position, which means that it is not possible to indicate an absolute angle position. Therefore, a segment 33 or else a tooth in the rotation speed sensor 31 can be defined as a reference point or zero point, for example at a particular instant, for example when the ignition of the vehicle and accordingly the controller installed in the vehicle are switched on. With reference to this rotation angle position, the subsequent wheel angles can then be calculated on the basis of the subsequently passing edges being counted. After every passage of—in the cited example—96 edges (in the case of rotation in the same direction), the reference position is reached again and hence one complete revolution has been executed.

When counting the edges, it is necessary to note the direction of movement of the wheel (forwards, backwards), that is to say whether edges are added to or subtracted from the current position. By way of example, the direction of movement can be determined by evaluating all four rotation speed signals. In addition or alternatively, the direction of movement can also be determined or plausibility checked by using additional measured variables, e.g. the vehicle acceleration, vehicle rotation (particularly the yaw or pitch behavior, etc.). The knowledge of the gearbox speed selected by the driver or the automatic driving system can also be evaluated for this purpose. Finally, it is also possible to use special new-generation wheel speed sensors which, from the outset, provide information regarding whether the vehicle wheel is rotating forwards or backwards. Hence, at any desired instant, there is always a current direction-of-rotation orientation available for the vehicle wheels.

Alternatively, it would also be conceivable to use specifically such alignment methods as are able to dispense with an absolute rotation position (that is to say the rotation angle position) of the vehicle wheels. In this case, by way of example, reference is always made just to the wheel rotation covered between two instants that is ascertained from the number of edges.

The rotation speed signals from the rotation speed sensor are typically made directly available to the braking or stability control system of a vehicle. Direct branching off of the transmission signals for other vehicle systems, such as the tire information apparatus, is usually undesirable or, for security reasons, impermissible, so as to prevent said signals from being corrupted. The rotation speed signals can therefore be coupled to a communication bus in the vehicle after preprocessing by the braking or stability control system, so that the rotation speed signals are therefore available to other systems.

In the case of cyclically sent transmission signals from the wheel electronics, the number of edges counted from the rotation speed sensors since the most recently sent transmission signals is sent. A typical cycle time for the transmission of a respective transmission signal is between approximately 10 msec and 20 msec.

Match

When the transmission instants of the received transmission signals are matched with the associated angle positions, it is possible to establish a fixed relationship between the transmission instants of the radio transmissions of any combinations of wheel electronics units and rotation speed sensor which are associated with the same vehicle wheel over a considered evaluation period Tx. In this case, each wheel electronics unit uses the telegram in its transmission signal to send an explicit identifier which makes it possible for the vehicle to identify the respective wheel electronics.

Figure 4:
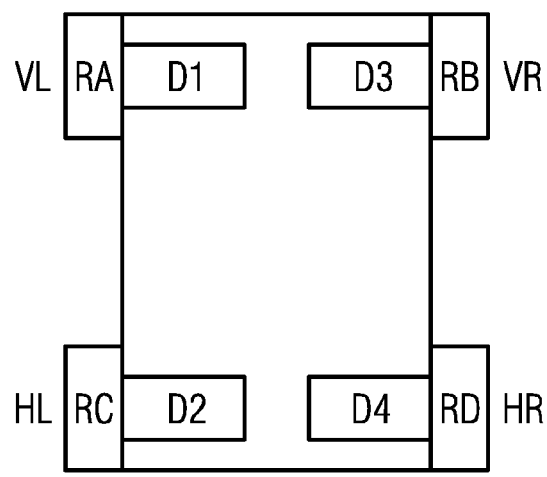
FIG. 4 shows the configuration of a vehicle with wheel electronics and associated rotation speed sensors.
Figure 5A:
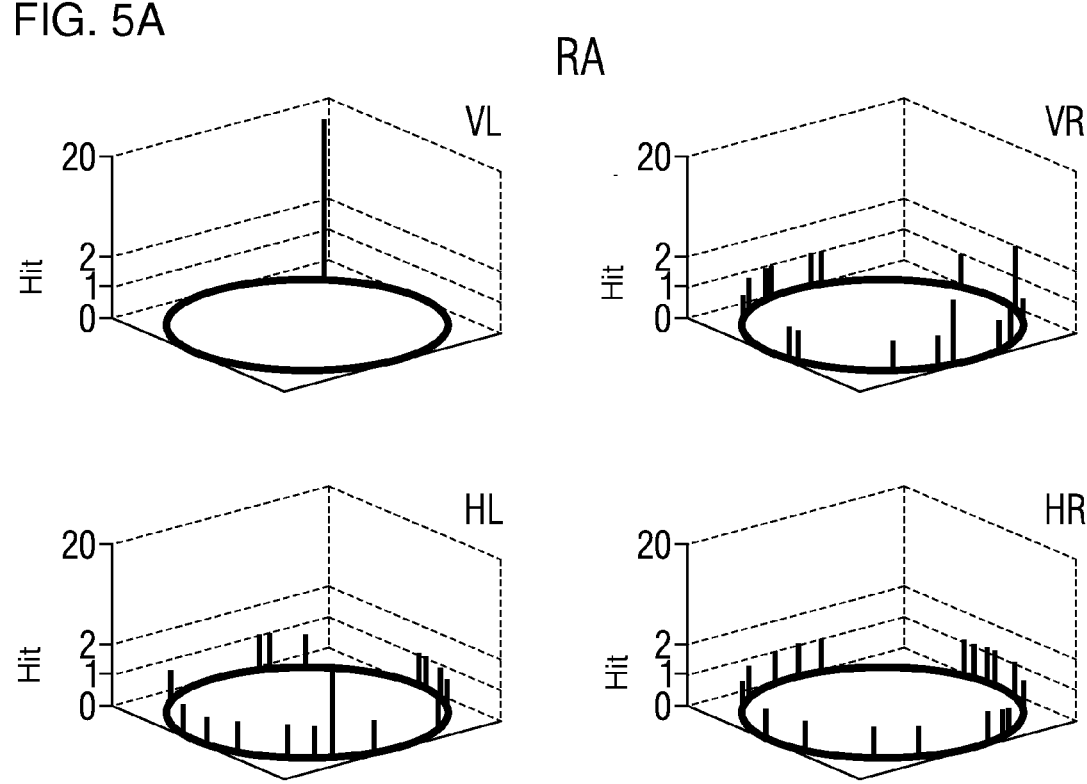
FIGS. 5A-5D show distributions of wheel angle positions of different vehicle wheels with reference to different wheel electronics.
Figure 5B:
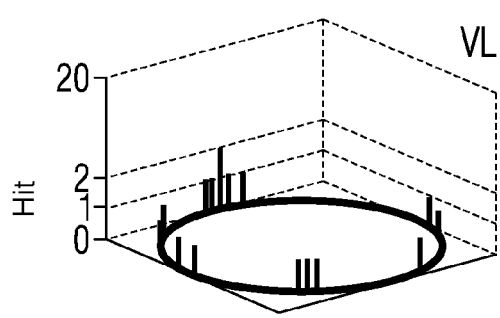
Figure 5B:
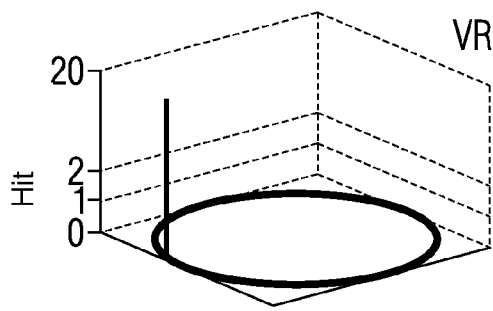
Figure 5B:
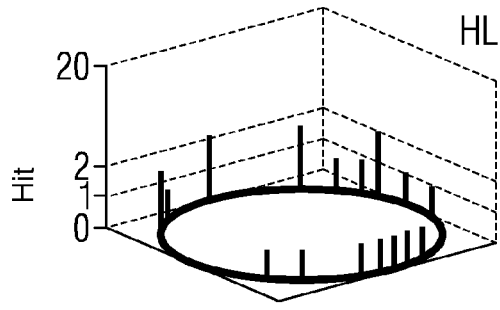
Figure 5B:
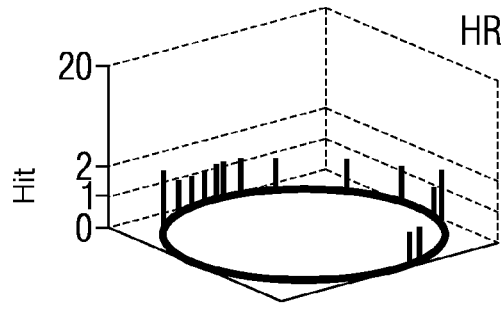
Figure 5C:
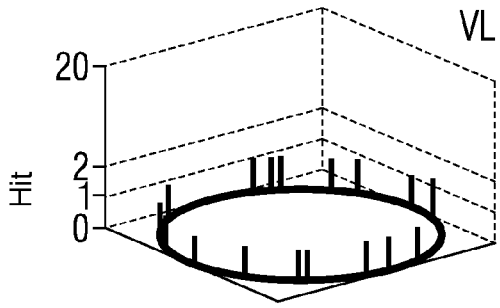
Figure 5C:
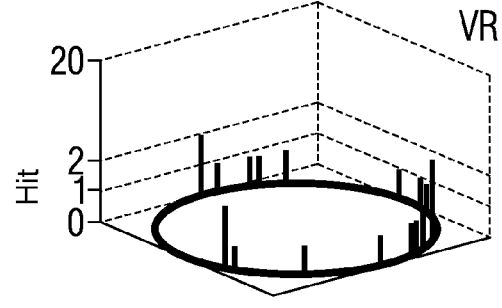
Figure 5C:
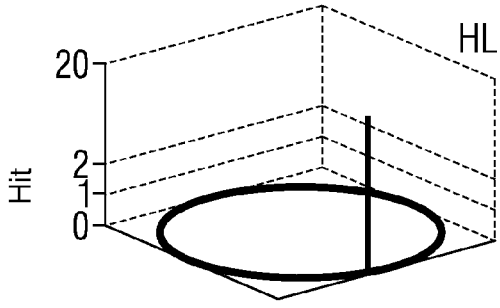
Figure 5C:
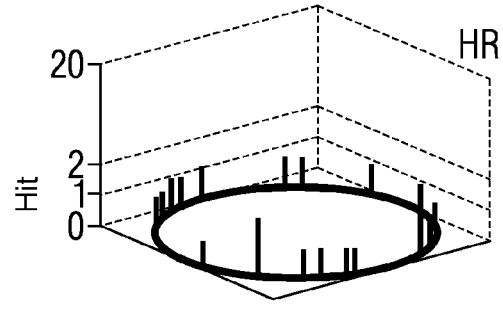
Figure 5D:
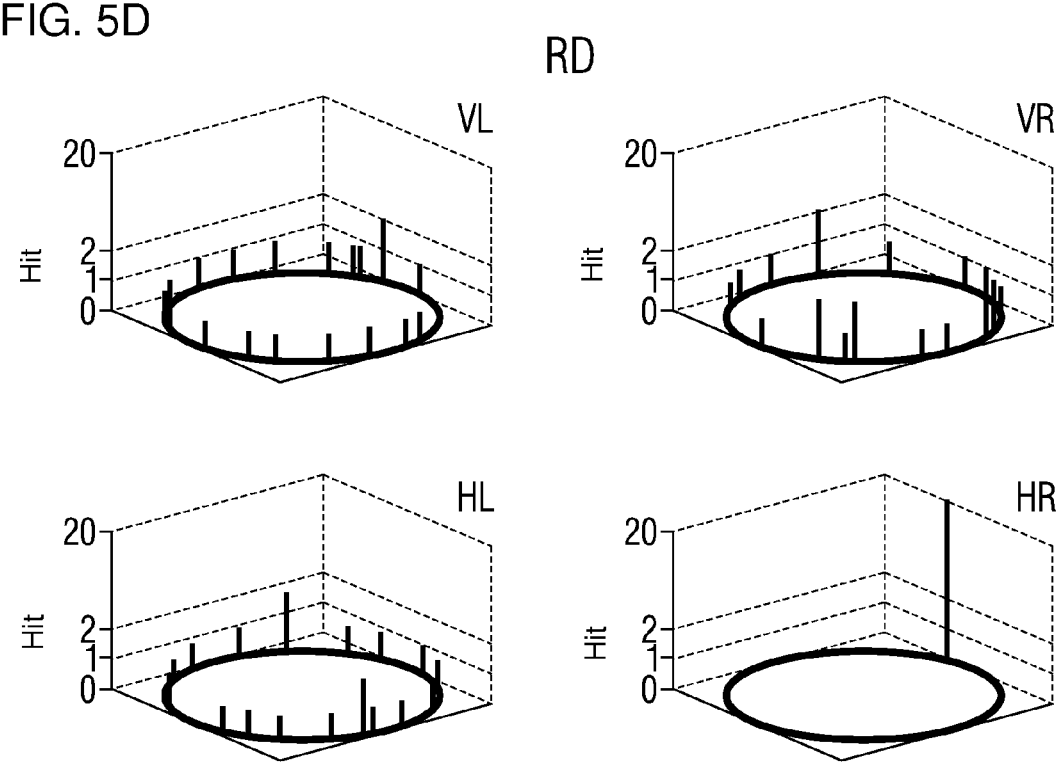

The vehicle configuration shown in FIG. 4 with wheel electronics units RA-RD and associated rotation speed sensors D1-D4 produces the relationship indicated in table 1, for example, where X denotes a match and "---" denotes no match. X indicates that there is a fixed relationship between the transmission instants of the emissions of a wheel electronics unit RA-RD and of the respective associated vehicle wheel FL, FR, RL, RR. An emission is subsequently understood to mean the transmission signal transmitted by a wheel electronics unit RA-RD.

TABLE 1

|    | D1 | D2 | D3 | D4 |
|----|----|----|----|----|
| RA | X  | —  | —  | —  |
| RB | —  | —  | X  | —  |
| RC | —  | X  | —  | —  |
| RD | —  | —  | —  | X  |

A match for a wheel electronics unit RA-RD will only ever exist with a signal vehicle wheel FL, FR, RL, RR which is respectively associated with said wheel electronics unit RA-RD, since all the vehicle wheels typically rotate individually during travel. Thus, by way of example, a vehicle wheel on the outside of a curve must cover a greater distance than a vehicle wheel on the inside of a curve, and it therefore rotates at a higher angle speed. Furthermore, a driven vehicle wheel usually encounters greater slippage than a nondriver vehicle wheel, which means that the driven vehicle wheel rotates slightly faster. In addition, differences such as tire fill pressure, tread depth, tire size (e.g. as a result of undesirable production variations), etc. result in different angle speeds for the vehicle wheels.

Ideally, an evaluation for the wheel electronics units RA-RD in a vehicle results in the relationships shown in FIGS. 5A-5D.

The text below is based on an automobile having a total of four vehicle wheels FL, FR, RL, RR, each of said vehicle wheels FL, FR, RL, RR having an associated wheel electronics unit RA-RD and an associated rotation speed sensor D1-D4, respectively. In this case, a reception device associated with the respective wheel electronics unit RA-RD in the vehicle picks up the respective emissions, that is to say the transmission signals sent by the different wheel electronics units RA-RD.

For the sake of better understanding, the four emissions associated with the different wheel electronics units are shown in four figures, FIGS. 5A-5D, where RA-RD respectively denote the four wheel electronics units. Furthermore, each of said FIGS. 5A to 5D contains four figure elements, each of which shows the distribution of the wheel angle positions as the number of hits for each installation position in the case of an emission by the respective wheel electronics units RA-RD, with FL, FR, RL, RR denoting the installation positions of the respective wheel electronics units RA-RD for a vehicle wheel-front left, front right, rear left and rear right. In this case, the distribution shows the number of hits separately for each installation position FL, FR, RL, RR, i.e. the number of hits per wheel angle position which has been measured by the wheel angle sensor when an emission was received.

The illustrations in FIGS. 5A-5D show the wheel angle positions which have thus been picked up in the form of a three-dimensional distribution (what is known as a histogram), in which the black circles each represent the wheel angle positions from 0° to 360° and the peaks or deflections which stand out from said black circles each represent hits for this wheel angle position. The plane of the ordinate shows the number of respective hits for the emissions in the case of a specific wheel angle position.

FIGS. 5A-5D each show 20 emissions and hence 20 transmission instants (emission instants) plotted on the respective rotation positions of the four vehicle wheels from 0-360. For each wheel electronics unit RA-RD, there is a respective installation position for a vehicle wheel FL, FR, RL, RR for which all the ascertained wheel positions for this emission instant match. No or barely any match can be found for the other three vehicle wheels. In addition, it can be seen that an absolute indication of the position of the wheel angle is not absolutely necessary for an explicit association.

The presentations in FIGS. 5A-5D can thus be interpreted to mean that a suitable vehicle wheel FL, FR, RL, RR with matching emissions is always oriented in the same way in the case of an emission for the angle position of the vehicle wheel or that a whole number of wheel revolutions is always executed between two successive emissions.

Figure 6A:
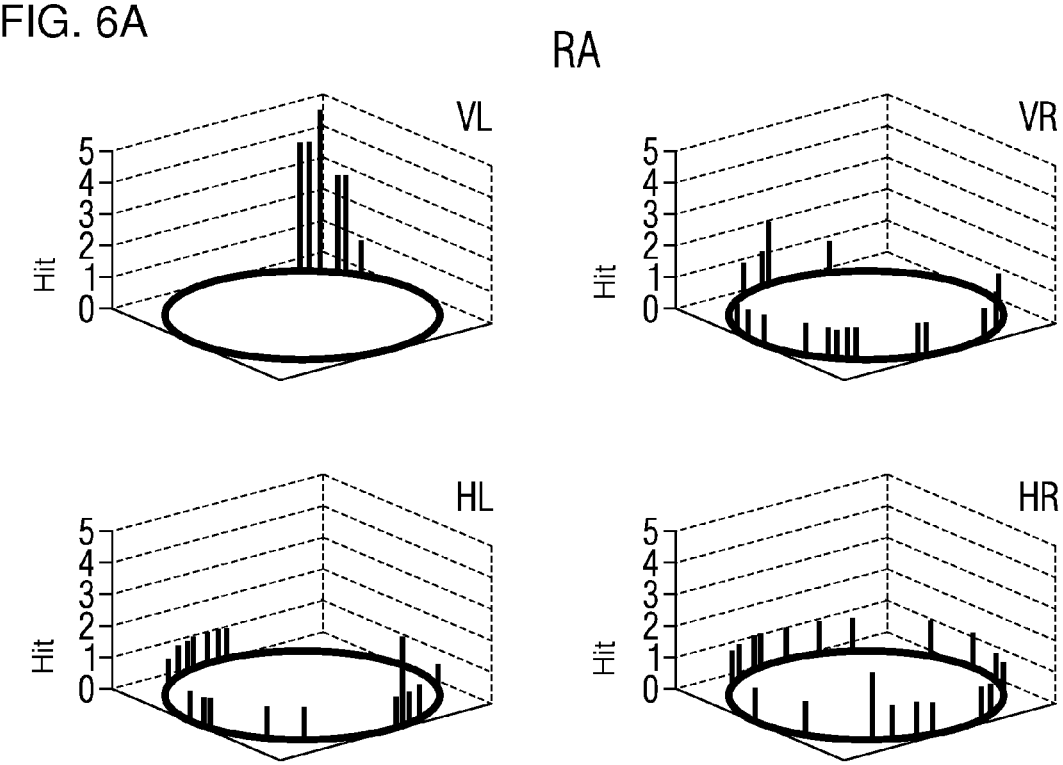
FIGS. 6A and 6B show a three-dimensional presentation and a two-dimensional presentation, respectively, of the distributions of the wheel angle positions of different vehicle wheels for wheel electronics.
Figure 6B:
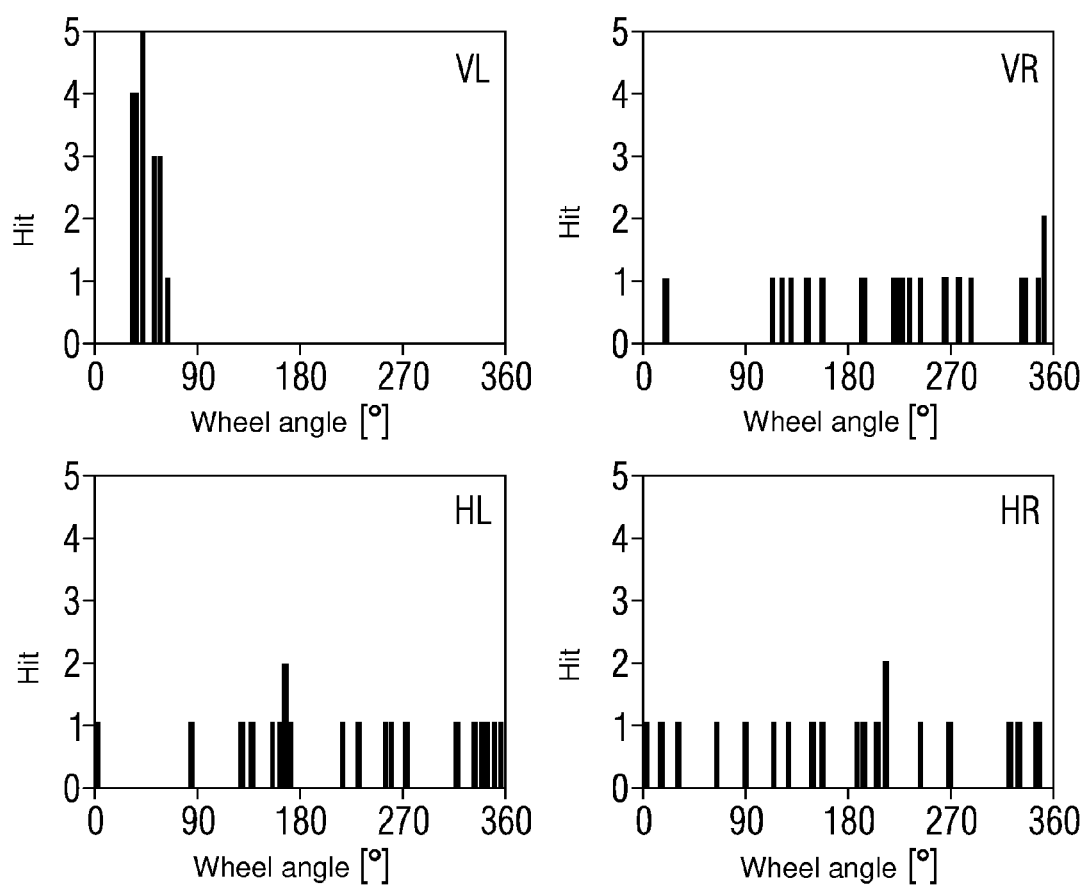

In reality, such exact matches are rather improbable. By way of example, this is because of processing times in the controller, delay times for reception and for the further processing of the transmission signals, uncertainties in the angle position recognition in the wheel electronics, noise, etc. Accordingly, an illustration of the three-dimensional histogram shown in FIG. 6A will more readily be obtained, with only the relationship between the different emissions for the wheel electronics unit RA being shown in this case. FIG. 6B shows another presentation in the form of a histogram, said other presentation showing the distribution of the emissions over the wheel positions in a somewhat different manner. In principle, the vehicle wheel is sliced from 0° to 360° and plotted on a straight line. This presentation is used subsequently.

FIG. 6B shows that the wheel angle values in the case of the suitable vehicle wheel, that is to say in the case of the vehicle wheel with a matching wheel angle position, do not match exactly for every radio transmission. On the contrary, statistical clustering is obtained for an angle range which typically has a clearly identifiable mean and a certain variance. However, there continues to be a distinct relationship identifiable between the wheel electronics unit RA and the associated, front left vehicle wheel FL. The evaluation method outlined below is used to ascertain these relationships between the wheel electronics units RA-RD and the associated vehicle wheels FL, FR, RL, RR on an abstract basis.

Evaluation method: Determination of whole-numbered revolutions, interpolation of wheel speed signals from the communication bus.

In principle, it is possible to use various concepts for evaluating the relationships between emissions by the wheel electronics units and the wheel orientations in the controller of the tire information apparatus. Various approaches are described below, said approaches preferably also being combined with one another:

1. Clustering/Concentration of Emissions by a Wheel Electronics Unit for a Particular Wheel Orientation:

FIG. 6B shows that the emissions always occur at a wheel angle position and hence at an instant when the front left vehicle wheel FL adopts an angle of orientation of approximately 45°. By comparison, it is not possible to see any such relationship between the emissions for the other vehicle wheels FR, RL, RR.

Existing clusterings, which therefore allow influence of the match between the emissions and the vehicle wheel, are numerically quantified in this first approach. To this end, it is possible to calculate the statistical variance in the hits for the ascertained wheel angle position, for example. It is evident that the scatter of the hits of the graph in FIG. 6B with reference to the rotation position is far smaller for the front left vehicle wheel FL than that for the distribution for the remainder of the vehicle wheels FR, RL, RR.

Alternatively, it would also be possible to evaluate the maximum (maximum number of hits at a wheel angle position) within the four different histograms. Thus, by way of example, FIG. 6B shows the value 5 for the matching vehicle wheel FL, that is to say 5 emissions have been received with the same wheel angle position, whereas only values of 1 or no more than 2 exist for the other vehicle wheels FR, RL, RR.

However, since these are again nonideal "noisy" measured values, it makes sense not only to evaluate the individual value of the respective maximum but also to evaluate the values which are together in the region of the maximum. Depending on the number of these measured values, a more or less explicit statement is then obtained, with the distinctness being able to be increased the more measurement results and hence emissions are included. It is naturally advantageous to combine both of the aforementioned methods, that is to say the evaluation of the variance in the distribution in combination with the evaluation of the maxima.

2. Match Between Time Intervals Between Two Wheel Electronics Emissions and Whole Revolutions of Wheels:

The front left vehicle wheel FL usually executes an approximately whole number of revolutions between two emissions by the wheel electronics unit RA. Whether a vehicle wheel executes whole-numbered revolutions can be determined very well by means of what is known as modular division. In this regard, it is possible to use the number of wheel speed sensor edges since the last emission, e.g. 960 edges for 10 revolutions at 96 edges per revolution. If the remainder from a modular division by the number of edges results in zero for a full revolution, the relevant vehicle wheel had executed a whole number of revolutions.

In practice, however, it is found instead that the emissions by the wheel electronics does not take place exactly at the same location, for example as a result of inaccuracy in the position finding, clocking for the signal processing only in particular time intervals in the wheel electronics, etc., which means that the relevant vehicle wheel does not always execute precisely one revolution. In practice, slight deviations will always arise in relation to a full revolution, e.g. in the case of 962 edges the remainder from the modular division is then 2, particularly if a longer consideration period and hence a large number of revolutions are involved.

In addition, approaches that have been known generally to date relate to a comparison for individual intervals between two successive emissions by the wheel electronics units. If, by way of example, there are only two emissions by wheel electronics units available at the successive instants T1 and T2 and hence angle changes in the four vehicle wheels (FL, FR, RL, RR) are followed by a search for whole-numbered revolutions, the accuracy of the recognition will be restricted, particularly if the vehicle wheels have rotated only slightly differently in these periods. The same effect is obtained for further measurements at the instants T3, T4, T5, T6.

The method according to the invention thus involves proposing what is known as a cumulative method that greatly improves the performance of the position recognition. The cumulative method allows for all possible combinations to be assessed, that is to say not just T1-T2, T2-T3, T3-T4, etc. In this case, in the case of emissions/measurements at the instants T1, T2, T3, T4, T5, T6, the following combinations are assessed, for example:

T1-T2,
T1-T3,
T1-T4,
T1-T6,
T2-T3,
T2-T4,
T2-T5,
T2-T6,
T3-T4,
T3-T5,
T3-T6,
T4-T5,
T4-T6,
T5-T6.

Hence, with n different measurements T1 to Tn, a total of $n*(n-1)/2$ combinations which can be examined are generally obtained. It can be seen that the advantage in comparison with the simple method cited above becomes all the greater the more measured values n are available. The advantage is based on less of an assessment of the relationship between two events, but rather on consideration of the entire relationship between preferably all or at least a relatively great number of emissions.

It has already been explained above how the wheel angle position or the orientation of the vehicle wheels can be reconstructed at any instant on the basis of the pulses from the wheel speeds. One difficulty arises in this case when the pulses are provided by another controller in a message on a communication bus. These messages are usually not send precisely at the instants of the radio transmissions at which the information is required, however. In this case, the wheel angle positions are reconstructed at a desired instant such that interpolation methods can be applied within the instances of message reception on the communication bus. A cycle time of between approximately 5 msec and 100 msec is sufficiently precise for this.

Figure 7A:
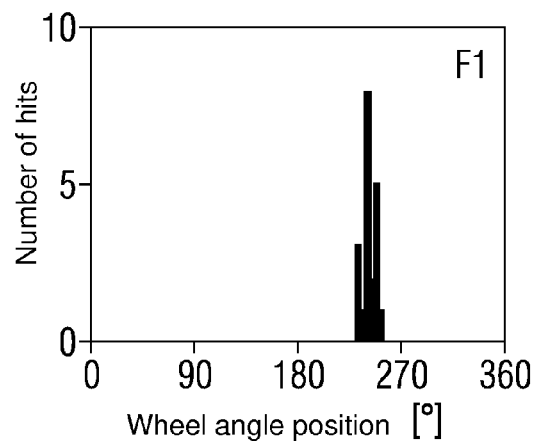
FIGS. 7A and 7B show the distributions of the wheel angle positions for the two vehicle wheels according to FIG. 7.
Figure 7B:
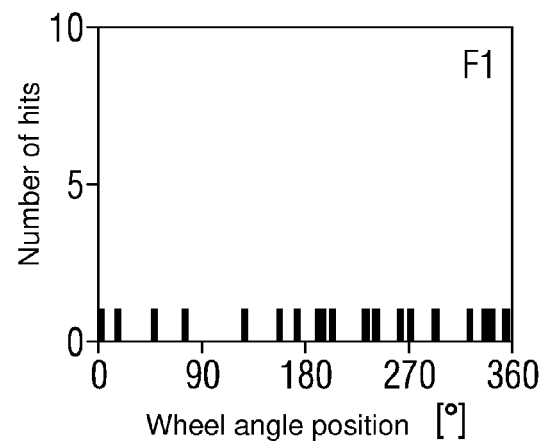

The text below describes an example to clarify the two evaluation methods described above with reference to table 2 in FIG. 7:

Table 2 in FIG. 7 shows—for 20 emissions by a wheel electronics unit—the counter readings available for these instants T1-T20 for the counted edges and the corresponding angle positions for two different wheels. At each instant T1-T20, the current orientation is determined with two wheels. The further vehicle wheels have not been shown in table 2. The angle orientation of the vehicle wheels is determined on the basis of the passing wheel speed pulses. The number of pulses/number of edges was reset to zero, for example, when the controller was switched on, and was then counted continuously further. In the example in FIGS. 7-7B, travel was strictly forwards, which means that the number of pulses increases with rigorous monotony as the transmission instant of the telegrams increases. The wheel orientations are obtained by virtue of the modular division by the number of pulses per revolution (360°=1 revolution) and by a subsequent matching of the pulses to an indication of degrees.

FIG. 7 shows that the first vehicle wheel F1 always assumes an orientation of approximately 240° when the wheel electronics are emitting transmission signals. No such relationship can be seen for the other vehicle wheel F2. These relationships are shown in FIGS. 7A and 7B in the form of a histogram. It is plain to see that, in the case of the vehicle wheel F1, the orientations are very highly concentrated on one position, no regularity being evident for the vehicle wheel 2. This corresponds to the first evaluation method, outlined above.

The text below describes the aforementioned second evaluation method with reference to FIGS. 8 to 8B: This method involves assessing the differences between two respective transmission instants. In the case of 20 transmission instants T1-T20, $20*19/2=190$ combinations are therefore obtained. Table 3 shown in FIG. 8 firstly shows the pulses/edges counted between the respective transmission instants and the number of wheel revolutions which is calculated therefrom. In addition, a difference in degrees is shown for the wheel revolutions in relation to a full wheel revolution.

It should be noted that the difference from a whole number of wheel revolutions is indicated as an absolute angle. Alternatively, it would naturally also be possible to assess a relative deviation in relation to the number of wheel revolutions.

Figure 8A:
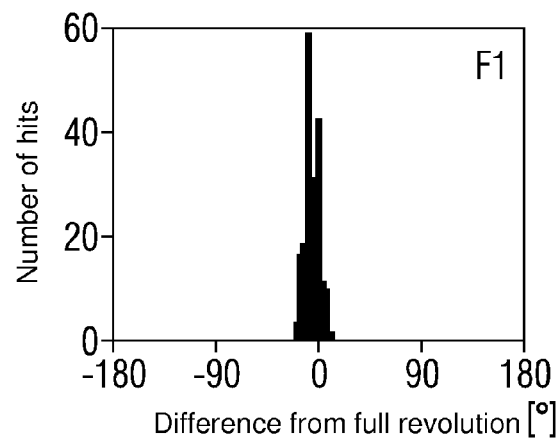
FIGS. 8A and 8B show the relevant distributions for the two vehicle wheels according to FIG. 8.
Figure 8B:
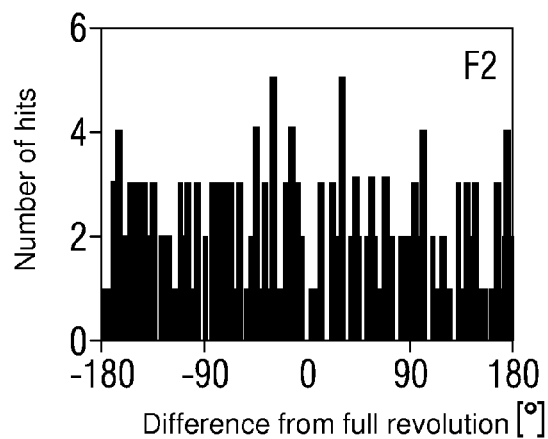

Table 3 in FIG. 8 shows that in the case of the first vehicle wheel F1 there is fairly precisely a whole number of revolutions between two emissions, whereas this is not the case with the vehicle wheel F2. This can again be shown with the aid of two histograms in FIG. 8A for the first vehicle wheel F1 and FIG. 8B for the second vehicle wheel F2. In this case, the deviations are each plotted with respect to a whole wheel revolution. On the basis of these graphs, it can be seen that the mathematical methods of the first evaluation method described above can be applied in order to determine a match and hence for an alignment.

In summary, it can be established that the aforementioned first method is oriented to the current, that is to say absolute, orientations of the vehicle wheels at the respective transmission instants and the second method is based on the relative extensions between two emissions, that is to say the relative orientation. Although both methods are not completely independent of one another, a combination of both methods for the evaluation results in even better performance for the position allocation.

Optimization of the Proposed Methods

Figure 9A:
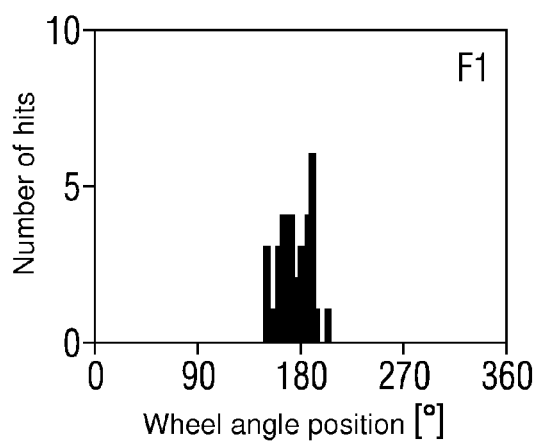
FIGS. 9A and 9B show two further distributions of wheel angle positions in order to explain a shift.
Figure 9B:
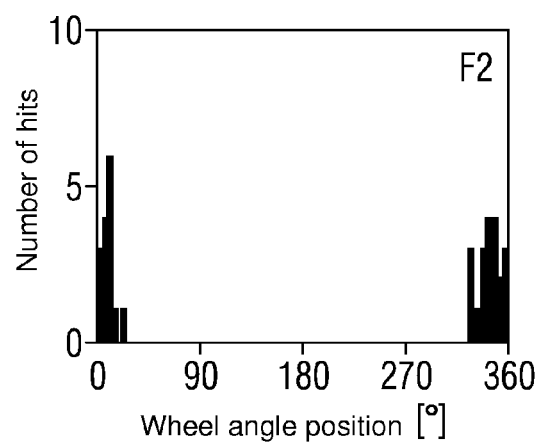

The first method described above involves a search for clusters/concentrations within the distributions, that is to say the histograms. This can be done by using generally known statistical approaches, such as determination of the variance of the standard deviation. However, it should be borne in mind in this case that an angle of revolution of 359° is also close to an angle of 1°, and the angle 360° even corresponds to the angle 0°. If clusterings for the rotation angles are obtained in these marginal angle ranges, as shown in FIG. 9B, for example, the evaluation using the known statistical approaches would become difficult. As a solution, the conventional statistical approaches cited above are expanded. By way of example, this is done by modifying the above method such that the "shifted" distribution is shifted by a particular interval "circularly" along the rotation of the wheel beyond the boundaries of the value range, or else reflections are used. In principle, however, it must first of all be detected that there is such a distribution over the boundaries of the value range. This is shown in FIGS. 9A and 9B. The illustration in FIG. 9A shows the same but shifted distribution as that in FIG. 9B, but the distribution in FIG. 9A has been shifted only by an absolute value of approximately 180° in comparison with the original distribution in FIG. 9B.

A further problem is that outliers are repeatedly found in practice in the distribution of the wheel angle positions. By way of example, these outliers may be caused by identification errors for the rotation position within the wheel electronics or else by calculation problems within the controller, e.g. by time delays in the transmission signals which are sent and received. This effect can be expected particularly frequently when the wheel electronics send highly noisy transmission signals, for example caused by unevennesses in the road and the like, at an incorrect transmission position and hence an incorrect rotation angle position. To a certain extent, low variability in the distribution can always be expected, as has also already been shown in the previous histograms, particularly when the intension is to evaluate a multiplicity of transmissions. The above methods usually also cope well with these scatters.

Figure 10A:
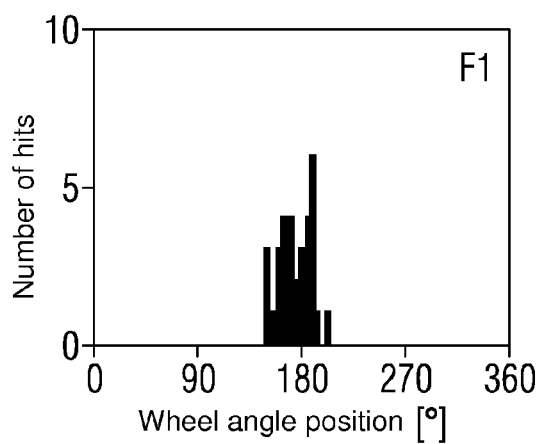
FIGS. 10A and 10B show two further distributions of the wheel angle positions in order to explain outlier detection and elimination.
Figure 10B:
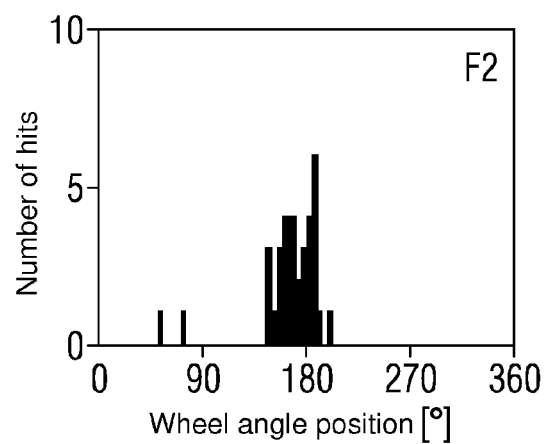

Problems are more readily caused by isolated outliers, as is shown in the histogram in FIG. 10B, where there are outliers of approximately 60° and 80°. If the cited statistical methods are now applied, such as the calculation of the variance, a much poorer assessment of the concentration around the mean will become evident at approximately 160° for the example in FIG. 10B. Firstly, the mean of the distribution is undesirably shifted to the left by the two outliers at 60° and 80°. Secondly, the scatter is increased. For this reason, the influence of the outliers is eliminated when optimizing the method, for example by preceding the statistical assessment with performance of preprocessing in which the isolated outliers, at 60° and 80° in FIG. 10B, are detected and are removed from the statistical assessment. FIG. 10A shows the distribution adjusted in this manner. This method of outlier detection can be used both for the first evaluation method and for the second evaluation method.

Interruptions in the Wheel Speed Signal

It is advantageous for the methods described above that the controller in the vehicle for the tire information system is continuously provided with correct rotation speed information, so that the wheel orientations can be correctly reconstructed. However, in practice, there are also situations in which this is not accomplished. Firstly, there may be failures on the internal communication bus, as a result of which such rotation speed information can be lost. Secondly, the controller may assume that a vehicle wheel is rotating forwards, since a forward gear has been selected, for example, but the vehicle is rolling backwards, e.g. on a slope. In addition, it may also arise that the vehicle is rolling but there is no direction information available in this regard. In all the cases cited, this results in an incorrect wheel orientation being calculated for the subsequent transmission instants. This means that the evaluation cannot be performed correctly, since, by way of example, a plurality of clusters in the distribution may arise in the case of the resultant histograms for a vehicle wheel.

In this regard, it is possible to use evaluation methods which are able to recognize a plurality of clusters, this being comparatively complex, however.

Alternatively, it would also be conceivable and advantageous for the first evaluation method to involve the processing always being applied to the time intervals in which it has been possible to determine contiguously and also correct wheel orientations. Ultimate allocation of the transmission positions then requires overall consideration of the individual time intervals. In the case of the second evaluation method, the implementation is even somewhat simpler. In this case, whole-numbered revolutions between two transmission instants are only ever sought between two instants which come from the same time interval with contiguously correct wheel orientations. Special consideration at the end is no longer necessary, since this only ever involves relative consideration of the wheel orientation instead of absolute consideration of the wheel orientation anyway.

Interruptions in the correct determination of the wheel orientations can be established in different ways:

Loss of a message on the communication bus can be detected from a discontinuity in the cyclic processing, for example. Rolling of the vehicle without direction information is recognized from the fact that it is possible to see edges in the rotation speed information but there is currently no direction information available. Rolling in the wrong direction can be recognized, by way of example, by virtue of a plausibility check using other signals from the vehicle, such as the vehicle acceleration, rotations, etc. In principle, this will also arise only when the vehicle speed is very low or is occasionally zero, since only then is it possible to change between a forward gear and a reverse gear.

Allocation of the Tire Position/Convergence Criteria

The assessment of the clusters in the emissions in relation to the wheel angle is the basis for the localization of the wheel electronics. However, the determination of the installation positions on the vehicle also requires an additional step which allocates the correct installation positions on the vehicle to the wheel electronics and hence to the associated vehicle wheels. This allocation can be effected on the basis of different criteria which can also be combined with one another:

Significance Criterion:

An assessment of the association with a vehicle wheel is performed for each wheel electronics unit. This involves determining the numerical measure of the association between a wheel electronics unit at each vehicle wheel, e.g. using the evaluation methods already described above. On the basis of the match between the emissions and the wheel angle positions, a more or less explicit image is obtained. In addition, a significance measure per wheel electronics unit is generated which assesses the relationship between the matches, particularly how significant the association with the most probable vehicle wheel becomes. If this measure exceeds a prescribed threshold, an explicit association or a probable association which satisfies at least one of the significance criteria is possible.

Inconsistencies in the Association:

In principle, it is possible for two different wheel electronics units seemingly to be able to be associated with the same vehicle wheel on the basis of the evaluation methods and the results obtained therefrom. Such inconsistencies in the association must be recognized. In these cases, an association between the wheel electronics and the respective installation positions is first of all prevented or suspended. An allocation is then made preferably on the basis of a direct comparison between the measures of significance for all the wheel electronics units and vehicle wheels.

Number of Processed Radio Emissions:

The more received emissions are processed, the more secure an association becomes in general. It is therefore advantageous to prescribe a minimum number of emissions which need to be at least present and evaluated before an allocation. In this context, it is advantageous to prescribe a minimum number of received emissions per wheel electronics unit, for example at least 5 and more preferably at least 10 and even more preferably at least 20.

Premature Allocation:

If three wheel electronics units are already able, with a very high level of certainty, to have their installation positions associated, it is possible, in the case of four wheel electronics units or vehicle wheels, to dispense with performing the evaluation for the remaining fourth wheel electronics unit and hence the as yet unoccupied fourth installation position. The localization function can then also be terminated. Similarly, if an association is already possible for the vehicle wheels on one axle, this association can also be made at that location. This is advantageous if, by way of example, only one axle association is required as a result of different axle pressures that are to be monitored. In this case, it is then already possible to monitor the tire fill pressures, for example—irrespective of the vehicle side information.

Many and diverse combinations of the items described above are conceivable, for example using AND and/or OR functions. In addition, special cases can also be implemented: If, by way of example, an association is possible on the basis of very explicit measures of significance, it would then also be possible to dispense with the requirement of a minimum number of emissions, for example.

On the one hand, the localization should be concluded as quickly as possible. On the other hand, the vehicle wheels on the vehicle rotate only slowly against one another during travel in most driving situations. Accordingly, it takes more or less time before explicit differences in the alignment methods to become evident and a safe association is possible. Usually, a compromise between fast localization on the one hand and safe localization on the other hand is therefore appropriate and desirable.

A transmission instant: sending instant and receiving instant for the telegrams sent and received The wheel electronics (transmission end) perform the following steps:

1. Await the transmission instant of an emission (transmission of a complete telegram) by a wheel electronics unit. Since the wheel electronics typically do not send continuously, however, and there is often also a prescribed minimum interval between two emissions, a wheel electronics unit must in each case await a time slice for emission, e.g. every 15 sec.
2. Detect a prescribed orientation or angle position for the vehicle wheel, which orientation or angle position requires a signal to be sent. Alternatively, it is also possible to recognize a current orientation for the vehicle wheel, in which case this information is also sent in the telegram in the transmission signal.
3. Compile the telegram in the transmission signal; prepare the radio transmission.
4. Begin sending a transmission signal (emission) which has a complete telegram.
5. End sending the transmission signal. A complete telegram has been sent.
6. Return to method step 1.

The reception device (receiver end) in the vehicle performs the following steps:

a. Await a transmission signal with a complete telegram.
b. Detect the beginning of a radio transmission.
c. Detect the end of the radio transmission.
d. Possibly transmit a timestamp with information about the instant of the radio transmission.
e. Return to a.

Instant b. at the receiver end corresponds to instant 4. at the transmission end. Since it is important that the evaluation unit in the vehicle, that is to say at the receiver end, knows when the transmitter-end wheel electronics have determined a wheel orientation, instant 2. is effectively sought. This is usually difficult. The receiver will therefore usually more readily determine instant c., i.e. the instant at which the telegram was received without error. In principle, it is also possible, but does not make absolute sense, to determine instant b. when dips in the radio transmission occur now and then during the reception of a sent and received transmission signal. From instant c., it is generally readily possible to deduce instant b., however, since it is typically known how long a radio transmission typically lasts. This knowledge is held on the basis of the volume of data which a complete transmission log contains and for the transmission of which a transmission device in the wheel electronics requires a known period. In that case, it is then only necessary to deduce instant 2. from instant 4. This is possible when the delay time is ascertained by analyzing the behavior of the wheel electronics. Accordingly, it is possible for the precise instant 2. to be deduced in the controller and for the four wheel orientations or wheel angle positions ascertained by the wheel electronics to be determined for said instant.

A further delay can arise when the telegram is transmitted to the evaluation unit/controller from an external reception unit outside the controller via a communication bus. In this case, a timestamp for the radio transmission can also be transmitted in the message. Alternatively, it would also be conceivable to observe a known, constant delay, which is required for the transmission on the communication bus, for the communication. This delay can then be subtracted again in the controller.

In general, it is naturally also desirable to keep all delays which are present as short as possible in order to process all information as far as possible in real time and without corruption.

For the behavior of the wheel electronics, it makes sense to expand the sequence described hitherto. In practice, it is occasionally the case that a wheel orientation cannot be determined, for example when signals with a high level of noise are available. By way of example, this occurs when a road on which the vehicle is traveling has severe cases of unevenness. If it is not possible to detect an orientation or else a time is exceeded during the recognition, this needs to be established in the wheel electronics. In this case, a radio telegram is usually still sent in order to send current information about the tires, such as the tire fill pressure, to the controller for monitoring. In this case, it is then necessary for the wheel electronics to also send advice in the telegram to the effect that an emission which is not related to orientation is involved. Hence, the controller only processes the sent information, but does not evaluate the radio transmission instant for localization.

When determining instant 2., there are also other factors which can play a part and therefore need to be borne in mind. These are explained briefly below:

It is known that the transmissions by the tire sensors have what are known as "black spots". These are angle positions of the wheel at which reception of a telegram by the receiver in the vehicle is difficult or totally impossible. This can be attributed to the radio link being impaired by bodywork parts, for example. It therefore makes sense not always to emit at the same position, but rather to also incorporate a random delay and hence the shifted wheel angle prior to the actual radio transmission, so that the most even possible distribution of the emissions over the complete wheel circumference of 360° is achieved. For the emission by the wheel electronics, it is then important that the telegram contains information about the respective random delay. This delay can then be subtracted again in the controller in order to obtain the original instant of the position recognition within the wheel electronics. Furthermore, it may repeatedly occur in practice that single transmissions are not received correctly, e.g. on account of radio interference or cancellations as a result of emissions by other wheel electronics units at the same time. For this reason, it is advantageous to send the information from the wheel electronics units redundantly. Accordingly, single frames or emissions are sent which contain identical information.

In practice, not every frame will be sent for a defined wheel orientation, but rather the predefined orientation will be determined for the first frame and then the other frames will be forwarded in a defined pattern. Within the context of the position-based sending by the wheel electronics units, it is therefore also necessary for the original detection of the orientation also to be deduced just from the reception of one or two of the frames in a burst. This requires each frame to carry information about which frame it is within the burst. With this knowledge and the knowledge of the pause times between the frames, the controller can then progressively deduce the original detection instant.

It should once again be pointed out that it is not absolutely necessary for the wheel electronics to recognize a particular orientation and to emit said orientation. Alternatively, it is also possible to recognize any orientation, to emit on the latter and to also send the respective orientation information in the transmission signal that is sent. In the controller, it is also again possible to search for a match between the transmission instants and the wheel angle positions from this information. The methods described can easily be adapted to this. In principle, however, it is simpler to recognize a prescribed orientation than to determine an orientation continuously.

Although the present invention has been described above with reference to preferred exemplary embodiments, it is not limited thereto but rather can be modified in a wide variety of ways.

The present invention is not necessarily limited to a tire information apparatus which is used in an automobile. On the contrary, the invention can be used for any vehicles, such as HGVs, buses, motorcycles, driveless trailers, etc. In particular, the invention is also not limited to the described numbers of vehicle wheels on the vehicle, and it is also possible to localize more or fewer than 4 wheel electronics units. Instead of wheel localization, axle localization would also be conceivable and advantageous.

At this juncture, it is pointed out that the invention also relates to the localization of tires as such, that is to say that the patent claims are also able to be read within the context of "apparatuses and methods for localizing at least one tire on a vehicle". In that case, the term "vehicle wheel" would then also need to be notationally replaced by "tire" in the remainder of the application.

In particular, the invention is also not limited to the manner in which the tire electronics determine a wheel position at which an emission is intended to take place. This can be accomplished in any manner, such as evaluation of a gravitation information item which has been ascertained by a gravitation sensor, an acceleration information item, derivation thereof, etc.

LIST OF REFERENCE SYMBOLS

10 Vehicle
11 Vehicle wheels
12 Wheel electronics
13 Transmission/reception devices
14 Controller for the tire information apparatus
15 Program controlled device, microcontroller
16 Memory device
17 Vehicle information system
20 Apparatus
21 Wheel electronics
22 Vehicle wheel
23 Reception device
24 Evaluation device
25 Stability control system
30 Disc
31 Rotation speed sensor
32 Bracket
33 Segments on the disc
RA-RD Wheel electronics units
D1-D4 Rotation speed sensors
S1-S5 Steps
T1-T20 Transmission instants
FL, FR Installation position/front left and right vehicle wheels
RL, RR Installation position/rear left and right vehicle wheels
F1, F2 Vehicle wheels
X1, X2 Transmission signals

The invention claimed is:

1. A method for localizing installation positions of vehicle wheels in a motor vehicle, in which at least one vehicle wheel has wheel electronics, which comprises the steps of:
repeatedly determining, via the wheel electronics in the vehicle wheel, when the vehicle wheel is in a predetermined angular position;
transmitting a plurality of transmission signals from the wheel electronics in the vehicle wheel, wherein each of the plurality of transmission signals indicates that a rotational position of the vehicle wheel corresponds to the predetermined angular position;
determining, via a plurality of rotation speed sensors in the motor vehicle, information indicating rotation angle positions for the vehicle wheels at instants of time at which the plurality of transmission signals are transmitted;
matching the predetermined angular positions of the vehicle wheel indicated by the plurality of the transmission signals from the wheel electronics in the vehicle wheel with the rotation angle positions determined by one of the plurality of the rotation speed sensors;
determining an installation position of the vehicle wheel by evaluating a number of matches between the predetermined angular positions of the vehicle wheel indicated by the plurality of the transmission signals from the wheel electronics in the vehicle wheel and the rotation angle positions determined by the one of the plurality of the rotation speed sensors.

2. The method according to claim 1, which further comprises, in the matching step, using at least two of the transmission signals.

3. The method according to claim 1, which further comprises sending, via the wheel electronics, each of the transmission signals at a respective prescribed rotation angle position which is known by the wheel electronics and in that the vehicle ascertains the rotation angle positions for each received transmission signal at an instant of reception of the transmission signal.

4. The method according to claim 3, wherein a distribution of the rotation angle positions is set up for each vehicle wheel, wherein the installation position is ascertained by evaluating at least one of maximum values of the distribution or variances of the distribution.

5. The method according to claim 4, which further comprises determining that the distribution which has greatest maximum values or smallest variances as the installation position of the vehicle wheel which is associated with the distribution.

6. The method according to claim 4, which further comprises detecting and eliminating outliers in the distribution of the rotation angle positions before the distribution is evaluated.

7. The method according to claim 4, wherein a cluster of the rotation angle positions close to 0° or 360° involves the distribution of the rotation angle positions being shifted by a prescribed value on an abscissa.

8. The method according to claim 1, which further comprises the steps of:
   a) determining the respective rotation angle positions for each vehicle wheel for at least two transmission signals received in succession by the vehicle from the wheel electronics;
   b) calculating differential values for the respective rotation angle positions of each of the vehicle wheels;
   c) calculating quotients from the differential values by a value which corresponds to a full revolution of a vehicle wheel; and
   d) determining the installation position as the vehicle wheel which has a smallest quotient.

9. The method according to claim 8, which further comprises sending, via the wheel electronics, at least N transmission signals and in that an evaluation and determination of the installation position of the vehicle wheel involve using at least N/2 combinations of the rotation angle positions, for each of which steps b) and c) are performed, and in that step d) involves the installation position determined being the vehicle wheel which cumulatively has at least one of a smallest quotients or a smallest distribution of the quotients.

10. The method according to claim 1, wherein delay times, which are obtained by virtue of purposely inserted delays or waiting times, the sending of the transmission signal, a reception and evaluation of the transmission signal by the vehicle, the forwarding of the predetermined angular positions of the vehicle wheel obtained from the received transmission signal, the ascertainment and forwarding of the rotation angle positions and the match of the predetermined angular positions of the vehicle wheel with the rotation angle positions from the one of the plurality of the rotation speed sensors, are also included in the evaluation and in the match.

11. The method according to claim 1, which further comprises ascertaining the rotation angle positions by counting at least one of rising clock edges or falling clock edges in a signal ascertained by a rotation speed sensor, wherein a prescribed number of clock edges corresponds to a full revolution of a vehicle wheel.

12. The method according to claim 1, which further comprises using at least six of the transmission signals for determining the installation position.

13. The method according to claim 1, which further comprises using at least twenty of the transmission signals for determining the installation position.

14. The method according to claim 4, wherein a cluster of the rotation angle positions close to 0° or 360° involves the distribution of the rotation angle positions being shifted by a prescribed value on an abscissa through 90°.

15. The method according to claim 4, wherein a cluster of the rotation angle positions close to 0° or 360° involves the distribution of the rotation angle positions being shifted by a prescribed value on an abscissa through 180°.

16. The method according to claim 8, which further comprises:
   sending, via the wheel electronics, at least N transmission signals;
   evaluating and determining the installation position of the vehicle wheel by using at least (N−1) combinations of the rotation angle positions, for each of which steps b) and c) are performed; and
   wherein step d) involves determining the installation position to be the vehicle wheel which cumulatively has at least one of a smallest quotients or a smallest distribution of the quotients.

17. The method according to claim 8, which further comprises:
   sending, via the wheel electronics, at least N transmission signals; and
   evaluating and determining the installation position of the vehicle wheel using up to $N*(N-1)/2$ combinations of the rotation angle positions, for each of which steps b) and c) are performed;
   wherein step d) involves determining the installation position to be the vehicle wheel which cumulatively has at least one of a smallest quotients or a smallest distribution of quotients.

18. An apparatus for localizing installation positions of vehicle wheels in a motor vehicle, the apparatus comprising:
   a reception device disposed in the motor vehicle;
   at least one wheel electronics unit disposed in a vehicle wheel and configured for determining when the vehicle wheel is in a predetermined angular position and for transmitting a plurality of transmission signals, wherein each of the plurality of transmission signals indicates that a rotational position of the vehicle wheel corresponds to the predetermined angular position;
   a plurality of rotation speed sensors disposed in the motor vehicle, each one of said plurality of rotation speed sensors is associated with a respective one of the vehicle wheels, said plurality of rotation speed sensors determining information indicating rotation angle positions for the vehicle wheels at instants of time at which the plurality of transmission signals are transmitted; and
   an evaluation device for matching the predetermined angular positions of the vehicle wheel indicated by the plurality of the transmission signals from the wheel electronics in the vehicle wheel with the rotation angle positions determined by one of the plurality of the rotation speed sensors, said evaluation device also for determining an installation position of the vehicle wheel by evaluating a number of matches between the predetermined angular positions of the vehicle wheel indicated by the plurality of the transmission signals from the wheel electronics in the vehicle wheel and the rotation angle positions determined by the one of the plurality of the rotation speed sensors.

19. The apparatus according to claim 18, wherein said rotation speed sensor is selected from the group consisting of an ESP rotation speed sensor and an ABS rotation speed sensor.

20. A vehicle, including an automobile, comprising:
   a plurality of vehicle wheels, wherein one of said plurality of vehicle wheels is subsequently referred to as the vehicle wheel;
   a tire information apparatus having an apparatus for localizing installation positions of said vehicle wheels, said apparatus containing:
      a reception device disposed in the vehicle;
      at least one wheel electronics unit disposed in the vehicle wheel and configured for determining when the vehicle wheel is in a predetermined angular position and for transmitting a plurality of transmission signals, wherein each of the plurality of transmission signals indicates that a rotational position of the vehicle wheel corresponds to the predetermined angular position;

a plurality of rotation speed sensors disposed in the vehicle, each one of said plurality of rotation speed sensors is associated with a respective one of the vehicle wheels, said plurality of rotation speed sensors determining information indicating rotation angle positions for the vehicle wheels at instants of time at which the plurality of transmission signals are transmitted; and an evaluation device for matching the predetermined angular positions of the vehicle wheel indicated by the plurality of the transmission signals from the wheel electronics in the vehicle wheel with the rotation angle positions determined by one of the plurality of the rotation speed sensors, said evaluation device also for determining an installation position of the vehicle wheel by evaluating a number of matches between the predetermined angular positions of the vehicle wheel indicated by the plurality of the transmission signals from the wheel electronics in the vehicle wheel and the rotation angle positions determined by the one of the plurality of the rotation speed sensors.

* * * * *